UNITED STATES PATENT OFFICE.

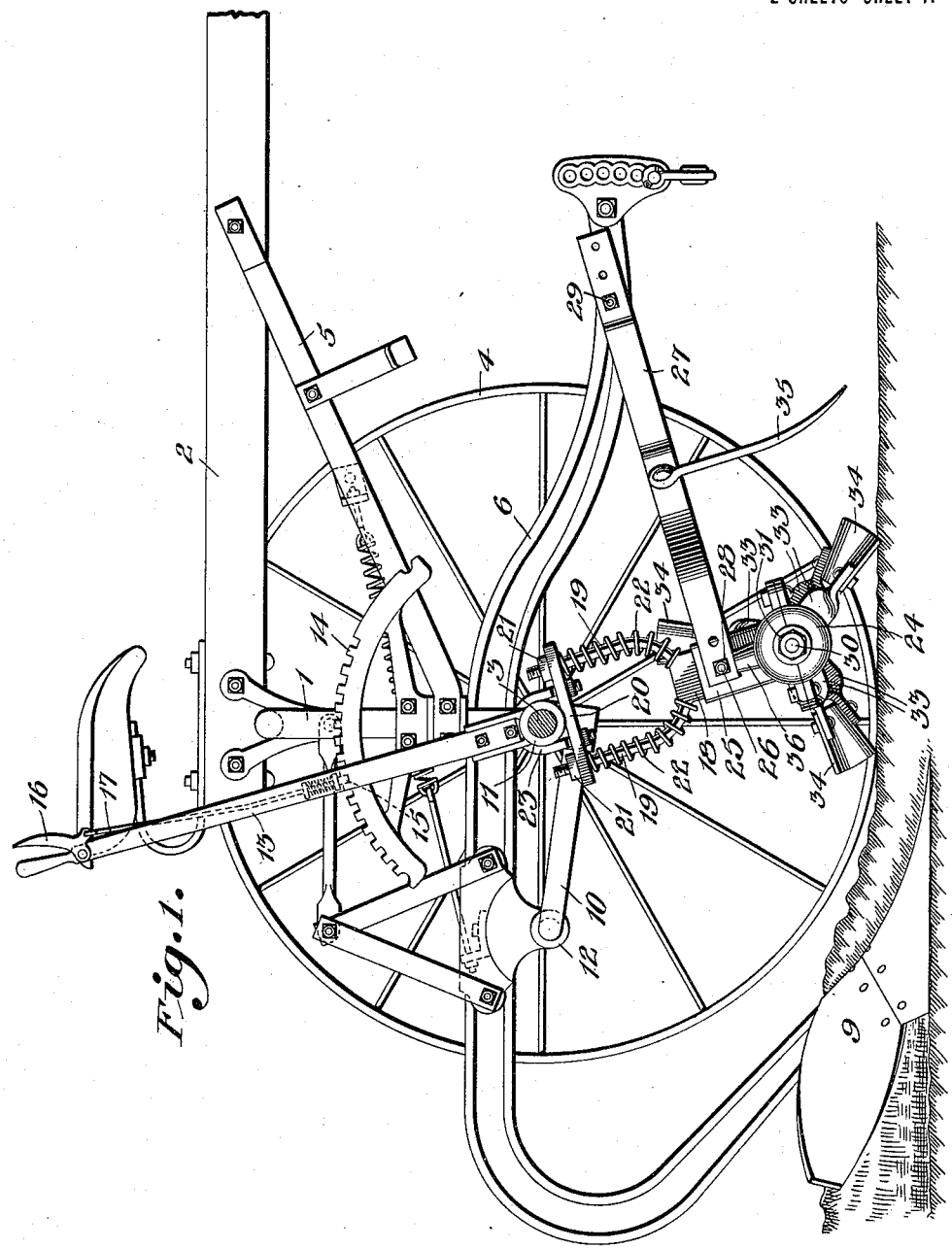

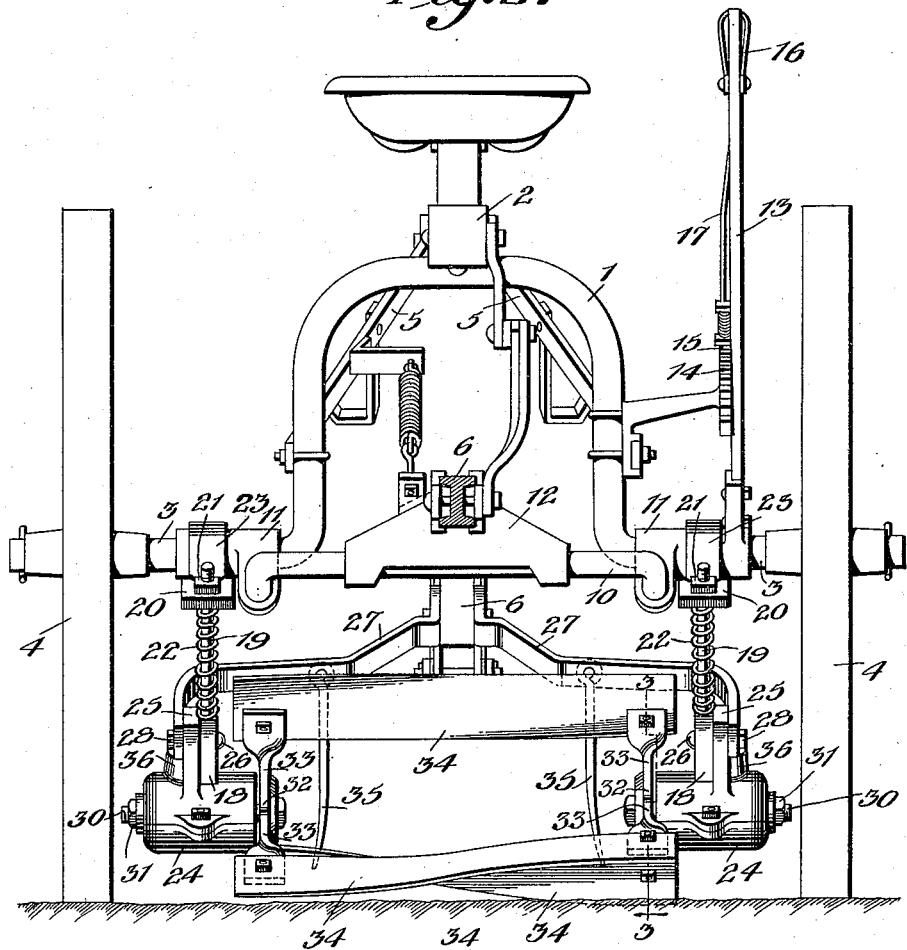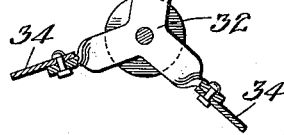

THOMAS B. ALSUP, OF ERICK, OKLAHOMA.

STALK-CUTTER.

1,164,774.　　　　Specification of Letters Patent.　　Patented Dec. 21, 1915.

Application filed June 5, 1915. Serial No. 32,392.

*To all whom it may concern:*

Be it known that I, THOMAS B. ALSUP, a citizen of the United States, residing at Erick, in the county of Beckham and State of Oklahoma, have invented a new and useful Stalk-Cutter, of which the following is a specification.

This invention relates to an improvement in stalk cutters, and the object is to provide means for connecting the cutter to a lister plow of any approved type, such for instance as the Canton, P & O, Kingman, John Deere, and "Sweet William," and many others.

Another object of the invention is the provision of means for maintaining the cutter in a position so that it can be raised and lowered with the plow, and when the plow is lowered the cutter will be lowered simultaneously and in a position for operation upon the movement of the plow.

A further object of the invention is the provision of means for cutting the stalks in advance of the plow so that the cut stalks may be turned under by the plow.

The invention consists of certain novel features of construction and combinations of parts, which will be hereinafter described and pointed out in the claims.

It is of course understood that many slight changes may be made in the form and arrangement of the several parts described without departing from the spirit and scope of the invention, and hence I do not wish to be limited to the exact disclosure herein set forth.

In the accompanying drawings—Figure 1 is a view in side elevation of the invention applied to a wheeled plow, showing one of the wheels removed. Fig. 2 is a view in rear elevation, and Fig. 3 is a transverse sectional view through the cutter.

The frame of the machine consists of an arched axle 1, rigidly connected to the rear end of the tongue or pole 2, and formed with horizontal extensions 3 consisting of spindles or axles upon which wheels 4 are mounted. The axle 1 is further connected to the tongue 2 by braces 5, 5. A fore and aft plow beam 6 is located between the ground wheels 4, and has a plow 9 connected thereto. The beam 6 is connected to the arched axle 1 by means of a bail 10. The ends of the bail are rigidly connected to the sleeves 11, which loosely encircle the extensions 3 of the axle 1. The central or horizontal portion of the bail 10 is mounted in a bearing 12 which is connected to the plow beam 6.

A lever 13 is connected to one of the sleeves 11, and is adapted to oscillate the bail 10 causing the plow beam to be raised and lowered. A toothed segment 14 is connected to the axle 1, and the teeth of the segment are adapted to be engaged by a pawl 15 carried by the lever 13, the pawl being actuated by a hand grip or lever 16 which is pivotally connected to the lever 13 and connected to the pawl by means of a link 17.

The frame of the cutter consists of a forked upright or post 18. The prongs or extension 19 of the upright having a plate 20 mounted thereon, which is held in position by nuts 21. Springs 22 are mounted on the extensions 19, which normally press against the plate 20 for forcing the upright or post 18 downwardly. The plates 20 are connected loosely to the axle 1 by means of hangers or straps 23, which embrace the sleeves 11. Split bearings or journals 24 are connected to the post or upright 18, by means of projections 25 formed on the bearings.

Bolts 26 pass through the posts and projections for fastening the posts and bearings together. Bars 27 are connected to the projections 25 by the bolts 26 and nuts 28 which are screwed upon the bolts. These bars 27 project inwardly toward each other, practically at right angles and parallel to the cutter, and then are bent forwardly at an angle and connected to the forward end of the plow beam 6 by means of a bolt 29. The bars 27 are provided with a plurality of openings at each end so that the bars can be adjusted for changing the angle of the cutter with respect to the beam to suit the demands.

Mounted in the bearings 24 are shafts 30 which are held in position by means of nuts 31. Mounted on the shafts 30 are heads 32 which are provided with a plurality of radial arms 33 to which are connected cutting blades 34. The cutting blades may be of any approved shape, but I have disclosed a twisted or curvilinear blade which will prevent any choking of the cutter in the cutting of the stalks.

Located in advance of the cutter blades, and connected to the right angular portions of the bars 27, are curved arms or hooks 35, which are adapted to straighten or turn the stalks that lie transversely of the line of travel so that the stalks will be in proper position for cutting as the plow is drawn across the field.

The cutter is adapted to be hung or suspended from the axle 1 so that the blades will come in contact with the surface of the ground, and be in a position to cut the stalks as the plow is drawn across the field. The cutter is permitted to move vertically when any obstructions or uneven surfaces are encountered by the blades, as the extensions 19 are capable of sliding through the plates 20. The elevation of the cutter is controlled by the nuts 21 which may be screwed on to the extensions 19 sufficiently to obtain the proper elevation or adjustment of the cutter.

It will be noted that the cutter is located in advance of the plow, and is hung somewhat at an acute angle from the axle, so that the operation of the cutter is insured and the blades will come in contact with the stalks at the proper angle for severing them.

The bearings 24 and projections 25 have abutments 36 formed thereon, and the abutments are adapted to engage the ends of the bars 27 to prevent the bars from oscillating, and insure the raising and lowering of the cutter upon the raising and lowering of the plow beam 6.

What is claimed is—

1. The combination with a plow beam, and an axle connected to the beam, of posts provided with forked extensions, means for loosely connecting the extensions to the axle, springs interposed between said means and posts for limiting the vertical movement of said posts, a cutter connected to said posts, and means connecting the cutter to the plow beam in advance of the axle for regulating the angle of the cutter.

2. The combination with a plow beam, and an axle connected to the beam, of posts provided with forked extensions, means for loosely connecting the extensions to the axle, said means including a plate with adjusting nuts springs mounted on said extensions below said plate for limiting the vertical movement of said posts, a cutter connected to said posts, and means connecting the cutter to the plow beam in advance of the axle for regulating the angle of the cutter.

3. The combination with a wheel plow consisting of an axle and plow beam, of a cutter, means for loosely suspending the cutter from the axle, and means for connecting the cutter to the plow beam in advance of the axle for controlling the angle of the cutter.

4. The combination with a wheel plow consisting of an axle and plow beam, of a cutter, and means for adjustably and loosely suspending the cutter from the axle at an angle thereto, and means for directly connecting the cutter to the forward end of the plow beam for regulating the angle of the cutter.

5. The combination with a wheel plow consisting of an axle and plow beam, of a cutter, means for adjustably and loosely suspending the cutter from the axle, said means including a spring support, and means for connecting the cutter to the plow beam in advance of the axle for governing the angle of the cutter.

6. The combination with an axle and plow beam, of a cutter, posts connected to the cutter at each side and provided with forked extensions which extend in front and in rear of the axle, means for adjustably connecting the forked extensions to the axle, and springs mounted on said extensions below said connecting means for resisting the vertical movement of said posts.

7. The combination with an axle and plow beam, of a cutter, posts connected to the cutter, means for loosely connecting the posts to the axle, said posts being capable of vertical movement with respect to said means, means for resisting the vertical movement of said posts, bars connected to the cutter, and means for adjustably connecting the bars to the forward end of the plow beam.

8. The combination with a wheel plow consisting of an axle and plow beam pivotally connected, means for raising and lowering the plow beam, of a cutter, posts connected to the cutter, means for loosely connecting the posts to the axle, springs interposed between said connecting means and posts for normally resisting vertical movement of the posts, and means connecting the cutter to the plow beam in advance of the axle, whereby the cutter will be raised and lowered upon the movement of the plow beam.

9. The combination with a wheel plow consisting of an arched axle and plow beam, sleeves loosely mounted on the extensions of the axle, a bail for connecting the sleeves and beam, means connected to one of the sleeves and adapted to oscillate the bail to raise and lower the plow beam, a stalk cutter connected to the sleeves and depending from the axle, and bars pivotally connecting the cutter to the beam in advance of the axle.

10. The combination with a wheel plow, consisting of an axle and plow beam, of a cutter, means for loosely suspending the cutter from the axle, said cutter being capable of a free upward movement, bars pivotally connecting the cutter to the forward end of the beam, and pivotally connected means for raising and lowering the plow beam and cutter.

In testimony that I claim the foregoing as my own, I have hereto affixed my signature in the presence of two witnesses.

THOMAS B. ALSUP.

Witnesses:
J. W. BRADSHAW,
J. B. SNYDER.

Copies of this patent may be obtained for five cents each, by addressing the "Commissioner of Patents, Washington, D. C."